United States Patent [19]
Zernov et al.

[11] Patent Number: 6,097,424
[45] Date of Patent: *Aug. 1, 2000

[54] SUBMERSIBLE VIDEO VIEWING SYSTEM

[75] Inventors: Jeffrey P. Zernov, Baxter; Anthony L. Capra, Minneapolis, both of Minn.

[73] Assignee: Nature Vision, Inc., Baxter, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/186,593

[22] Filed: Nov. 5, 1998

Related U.S. Application Data

[63] Continuation of application No. 29/090,232, Jul. 3, 1998.

[51] Int. Cl.[7] .................. H04N 7/18; H04N 9/47
[52] U.S. Cl. .................. 348/81; 348/61; 348/373; 348/374
[58] Field of Search .................. 348/81–82, 84–85, 348/373–374, 376, 61; 396/25–26, 28; 206/316.2

[56] References Cited

U.S. PATENT DOCUMENTS

| | | | |
|---|---|---|---|
| 3,017,817 | 1/1962 | Sampson | 396/25 |
| 3,261,274 | 7/1966 | Smith | 396/25 |
| 3,832,725 | 8/1974 | Cook | 396/27 |
| 4,184,758 | 1/1980 | Winnacker | 396/25 |
| 4,281,343 | 7/1981 | Monteiro | 408/112 |
| 4,853,722 | 8/1989 | Gell, Jr. | 396/26 |
| 4,860,038 | 8/1989 | Thatcher et al. | 396/25 |
| 5,089,895 | 2/1992 | Fraker et al. | 348/373 |
| 5,669,020 | 9/1997 | Hopmeyer | 396/27 |
| 5,778,259 | 7/1998 | Rink | 396/27 |

*Primary Examiner*—Vu Le
*Attorney, Agent, or Firm*—D. L. Tschida

[57] ABSTRACT

A modular submersible video viewing system. The system includes a viewing monitor, multi-conductor cable and camera that store at a portable housing and deploy for underwater viewing. The camera can be submersed for stationary viewing, towed from a watercraft or manipulated with an operator pole. The camera can be secured with clips or bottom support plates in various orientations or be secured to a swivel coupler and steering guide and/or pole. A rudder, ballast weight (with or without a keel), lens' sunshield, lights and/or lenses and filters are optionally mountable to the camera. In one portable assembly, a cable spool mounts to a carry case that stores the system components. In another portable assembly, the viewing monitor, battery and attendant control circuitry are mounted in a monitor housing having an integral sunshield. A handle and a pair of cable wrap arms contain the cable. A recess at the monitor housing supports the camera. The housing can be supported on the floor or from a wall bracket to permit viewing through the sunshield. In another portable assembly, the sunshield can be detached from the housing.

23 Claims, 16 Drawing Sheets

SUBMERSIBLE VIDEO VIEWING SYSTEM

This is a continuation of Ser. No. 29/090,232 filed Jul. 3, 1998.

BACKGROUND OF THE INVENTION

The present invention relates to underwater cameras and, in particular, to a viewing system that includes a surface-viewing monitor and a boat-mounted or hand-held submersible camera.

Varieties of sonar depth indicators and fish-finders have been developed to assist fresh and saltwater fisherman. These devices monitor solid objects that are encompassed in a column of water included in the paths of transmitted and reflected signals relative to the bottom of a body of water. The objects are displayed at surface monitors as flashes of light, marks on a paper graph or indicia at a screen of a CRT, LCD or other electronic display.

Depending upon device capabilities, sonar equipment will detect and display fish, debris, flotsam, thermoclines, bottom structure and bottom hardness, among other physical parameters of possible interest. The utility of any device, however, is dependent upon the operator's ability to distinguish and interpret displayed indicia. Electronic circuitry can be included to assist in the display of data. For example, a fish symbol can be displayed after passing received signals through a comparator circuit having a threshold level indicative of a fish. A variety of other automatic detection, interpretation and presentation circuitry for other parameters of interest can also be designed into each monitoring system.

Sophisticated, real time underwater video systems have also been developed for use in deepwater exploration. This equipment is very costly and is typically used by oil companies, archaeologists, researchers and salvage operators. However, it provides a true video image of encountered objects, fish etc.

Less sophisticated video systems have also been developed for sport fishing applications. These systems include submersible black and white or color cameras, a surface monitor and a signal cable that shrouds necessary power and optical conductors. Camera support assemblies are also available that accept a rudder or pole. Mounts are also available for attaching lights to the sides of the camera. Some systems provide audio capabilities.

Existing systems are generally configured around "off the shelf" components. Consequently, operating performance can suffer from an inability to maintain a known and constant attitude and orientation of the camera to a support watercraft. Sunlight can effect viewing at the monitor screen. Reflections from camera mounted lights and diffused light in the water can produce reflections and degrade the clarity of the transmitted video. Cord and component storage and deployment can also be cumbersome.

The present system was developed to provide a modular collection of components that are combined to overcome problems of component storage, moisture contamination at the camera, monitor viewing, and hydrodynamic tracking of the camera relative to boat or pole movement. An improved monitor housing physically protects and permanently contains the viewing monitor and stores attendant support and control equipment, such as a battery, power supply and control circuitry, cabling and the camera and attachments. The housing screens the monitor to improve viewing under a variety of light conditions. The housing can also be supported on a boat deck or to a pivot bracket.

The camera includes a number of internal light sources. Lenses having anti-reflective coatings and/or bi-focal surfaces are fitted to the camera. The camera housing is filled with a desiccant. The camera housing accepts a variety of accessories, for example, rudders, ballast's, attitude controls, filters, external lights and/or other cameras. The cable core is filled with foam and other materials to prevent the migration of moisture and self-heal if abraded.

SUMMARY OF THE INVENTION

It is a primary object of the invention to provide a modular, submersible, video viewing system.

It is a further object of the invention to provide a viewing monitor housing that contains a viewing monitor, necessary audio and video controls and that stores the camera, cable and all system accessories for ready deployment.

It is a further object of the invention to provide a monitor housing having an integral handle, a shrouded sun shield, and a pivot bracket that permits operator viewing from seated or upright positions.

It is a further object of the invention to provide a monitor housing that contains a battery supply, an external power converter and/or AC/DC power monitor, audio speakers, camera and monitor controls, and storage space for system attachments and accessories.

It is a further object of the invention to provide a rubber-coated camera having concentrically arranged infrared (IR) or infra-blue (IB) lights, a sealed desiccant, a protruding bumper ring and a coated lens that may be provide multiple focal characteristics.

It is a further object of the invention to provide a camera housing that is compatible with accessory lenses, light filters, ballast weights, hydrodynamic rudders, attitude controls, a pole and/or stationary viewing supports.

It is a further object of the invention to provide a video system that can accommodate multiple cameras to provide forward and reverse viewing and/or an expanded field of view.

It is a further object of the invention to provide a moisture, sealed, self-healing cable that includes a number of power and signal conductors, a fiber core that prevents stretching, and/or means for dynamically controlling cable and camera orientation.

Various of the foregoing objects, advantages and distinctions of the invention are obtained in a presently preferred viewing system. In a first construction, a viewing monitor and system accessories are stored in multiple compartments of a carry case. A spool mounts around the case and stores a system cable. A fabric shroud or sunscreen can be fitted to the monitor.

In another construction, a portable housing is formed to permanently support the viewing monitor, attendant power supply and control circuitry to permit viewing through a shrouded or sun screened viewing space. The housing includes a handle, cable wraps, a camera storage cavity, and recessed input and output controls. The housing can be supported from the ground or a pivoting mounting bracket.

The cable supports multiple conductors and a KEVLAR core in a foam filled jacket that prevents moisture transmission to the camera. A moisture-activated filler included in the cable jacket self-heals the jacket against punctures and abrasions. Hydrodynamic vanes can be attached to the cable jacket and/or the cable jacket can be constructed to facilitate cable movement with minimal lift at the camera.

The camera is packaged in a rubber housing that contains a desiccant material. The camera housing may be purged with a rare earth gas. A number of IR lights are concentrically mounted around the camera. A bifocal lens coated with an anti-reflective material can be fitted to the camera to direct IR light and reduce external glare and internal reflections. One or more lenses or filters can be mounted to the camera and/or a servo-controlled mount to rotate the filters and/or a desired lens into alignment with the primary lens. A piezoelectric cooler can be fitted to the housing to cool the camera circuitry. External lights and a variety of sensors, such as for monitoring depth, temperature, pH, oxygen ($O_2$) and/or audio, can be mounted to the camera.

Bored webs project from the camera housing and selectively support rudders, ballast weights, a pole attachment, clip fasteners and stationary supports to control the camera orientation to the cable and/or lake bottom. Additional lights and a variety of other fittings, accessories and servo-controls can also be mounted to the camera.

Electrical or radio frequency (RF) controllers can be combined with appurtenant servo-controls to control monitor functions, such as switching between included functions. Other servo-controls mounted to the cable or signals directed from the cable can control camera attitude, lens and/or filter configurations. A bottom tracking transducer and servo can dynamically control the camera elevation to prevent snagging or damage from dragging.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
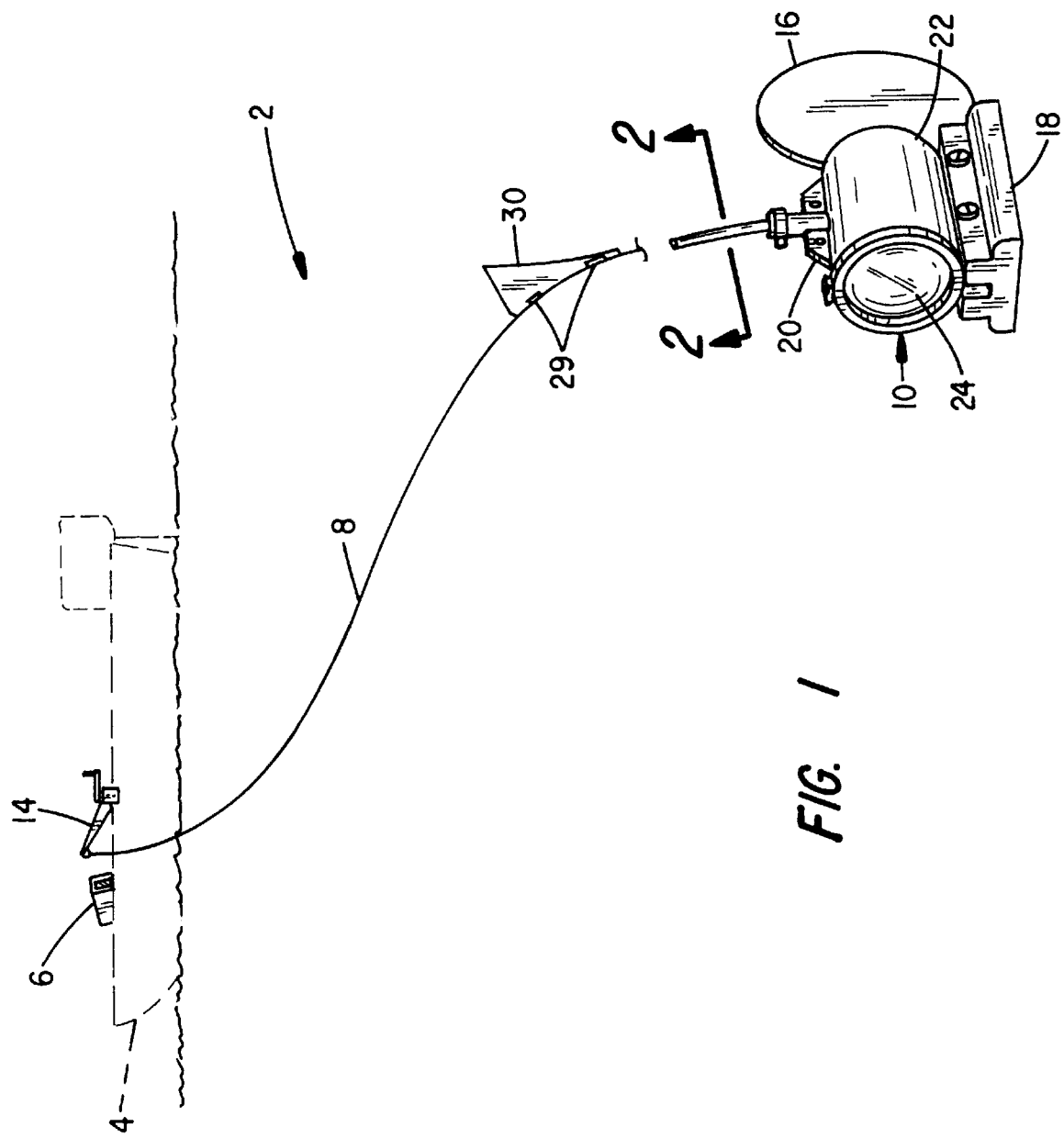
FIG. 1 is a diagram of a typical arrangement of the viewing system when towed behind a watercraft.

Referring to FIG. 1, a submersible video viewing system 2 is shown as it appears when configured for operation from a watercraft or boat 4. A viewing monitor 6 is supported at the boat 4 and a coaxial cable 8 is tethered to a submerged camera 10. A pair of conductors 12, reference FIG. 2, supply power and/or control signals to the camera 10. Additional conductors may be included in the cable 8. Video, audio and/or other sensed signals are transmitted over the conductors 12 from the camera 10 to the monitor 6 and associated control circuitry. A boat operator is thereby able to visually monitor for the presence of fish or submerged objects. The viewing range will depend on water clarity, depth and light conditions, among other factors. Surface turbulence, drag and tracking at the camera 10 may also effect viewing. Other physical parameters may also be monitored by the camera 10 and associated sensors mounted to the camera.

The relative position of the camera 10 to the boat 4 is principally determined by the speed of the boat 4 and the drag of the cable 8 and camera 10. Preferably, a relatively slow speed (e.g. drifting to 2 mph) is maintained to better control the viewing position of the camera 10. The length of cable 8 trailed from the boat 4 will depend upon the cable thickness, cable hydrodynamics, camera hydrodynamics and weight at the camera 10. The cable 8 can be deployed by hand, such as from a hand spool 64 or handles 94, reference FIGS. 13 and 14.

Figure 16:
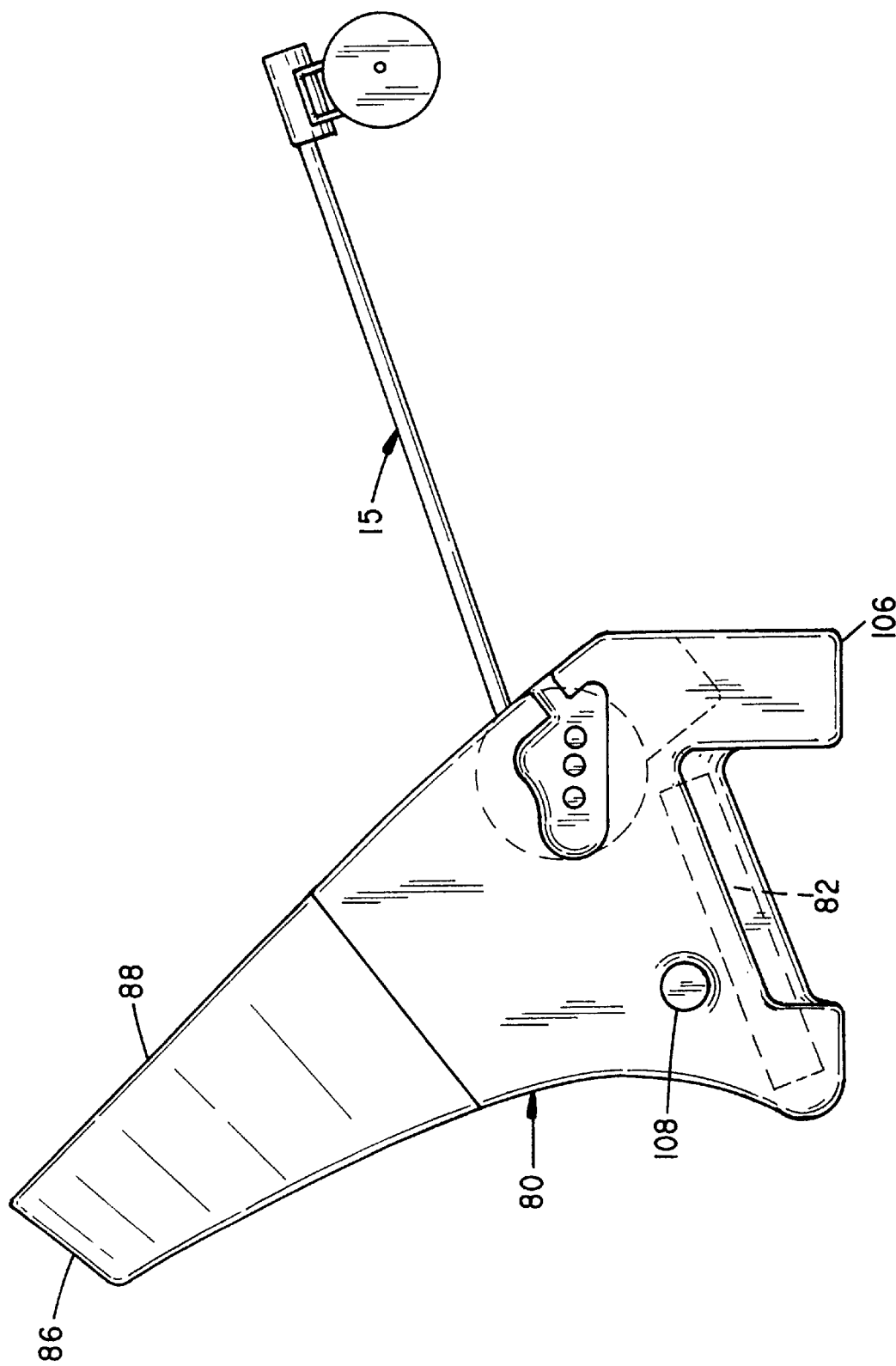
FIG. 16 is a perspective view of a monitor housing that includes a cable deployment boom.

A manual or powered take-up, boom assembly 14, similar to a conventional downrigger, can be fitted to the boat 4 to release and retrieve the cable 8. The assembly 14 improves operator control over the cable 8 when operating at depths greater than 100 feet or over bottoms with severe elevation changes. Servo controls can cooperate with the assembly 14 to sense camera depth relative to the bottom to maintain a desired position. Alternatively, FIG. 16 shows a motorized boom assembly 15 and end-pulley 17 fitted to an improved monitor housing 80 that is discussed in detail below. The drive motor (not shown) is mounted in the housing 80.

Figure 2:
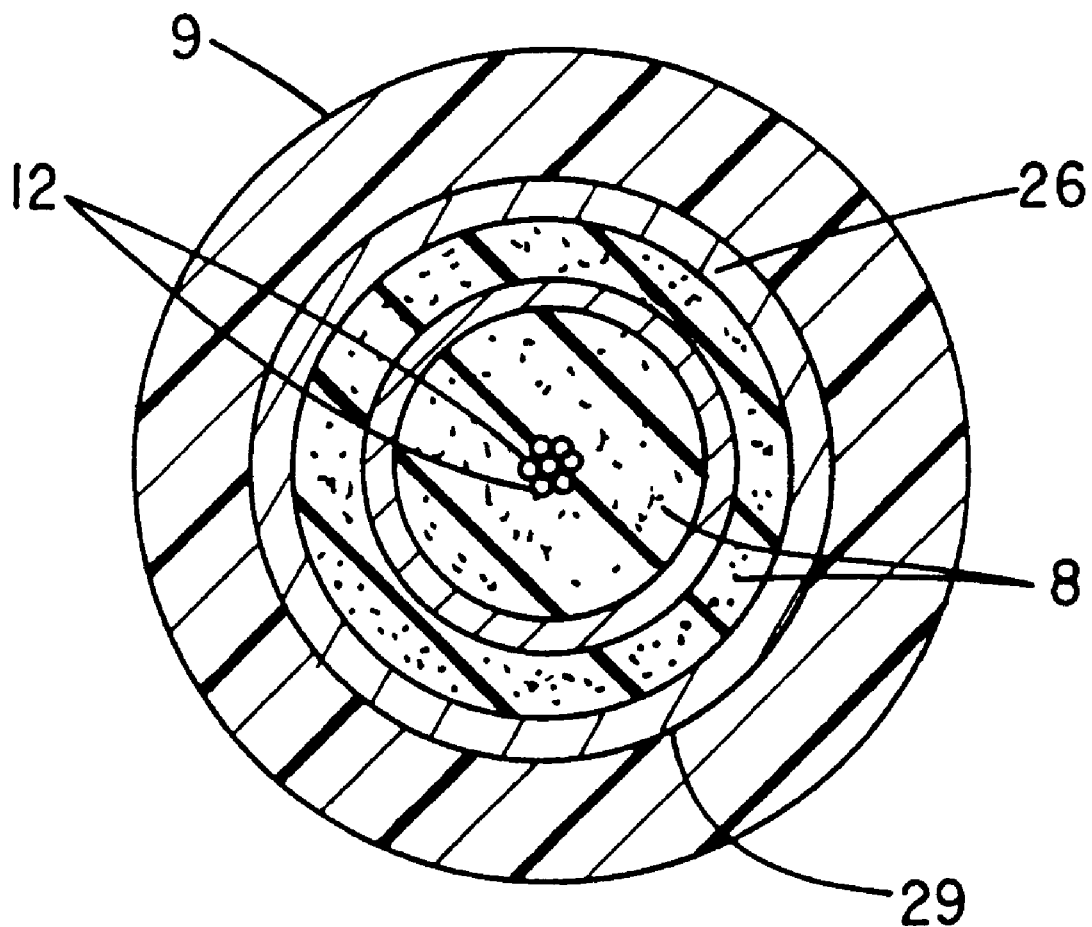
FIG. 2 is a cross-section drawing through the cable.

With attention to FIG. 2, the cable 8 presently has a nominal diameter of 0.150 inches. A thermoplastic jacket or cover 9 contains three conductors 12, a stranded KEVLAR cord 26, and a foam filler 28. One foot markings are provided on the outer cover 9 to provide a reference in the deployment of the cable 8. The cable 8 is also designed to self-heal via a water blocking gel material 29 that is contained in the cable 8. Upon exposure to moisture, the material 29 expands to fill any nicks or abrasions and prevent the migration of moisture through the cable 8 and into the camera 10. A variety of other types of cables might also be used. The number of conductors 12 can be varied depending upon the configuration of the camera 10 and/or available sensors or servos mounted along the cable 8 or at the camera 10.

Figure 3:
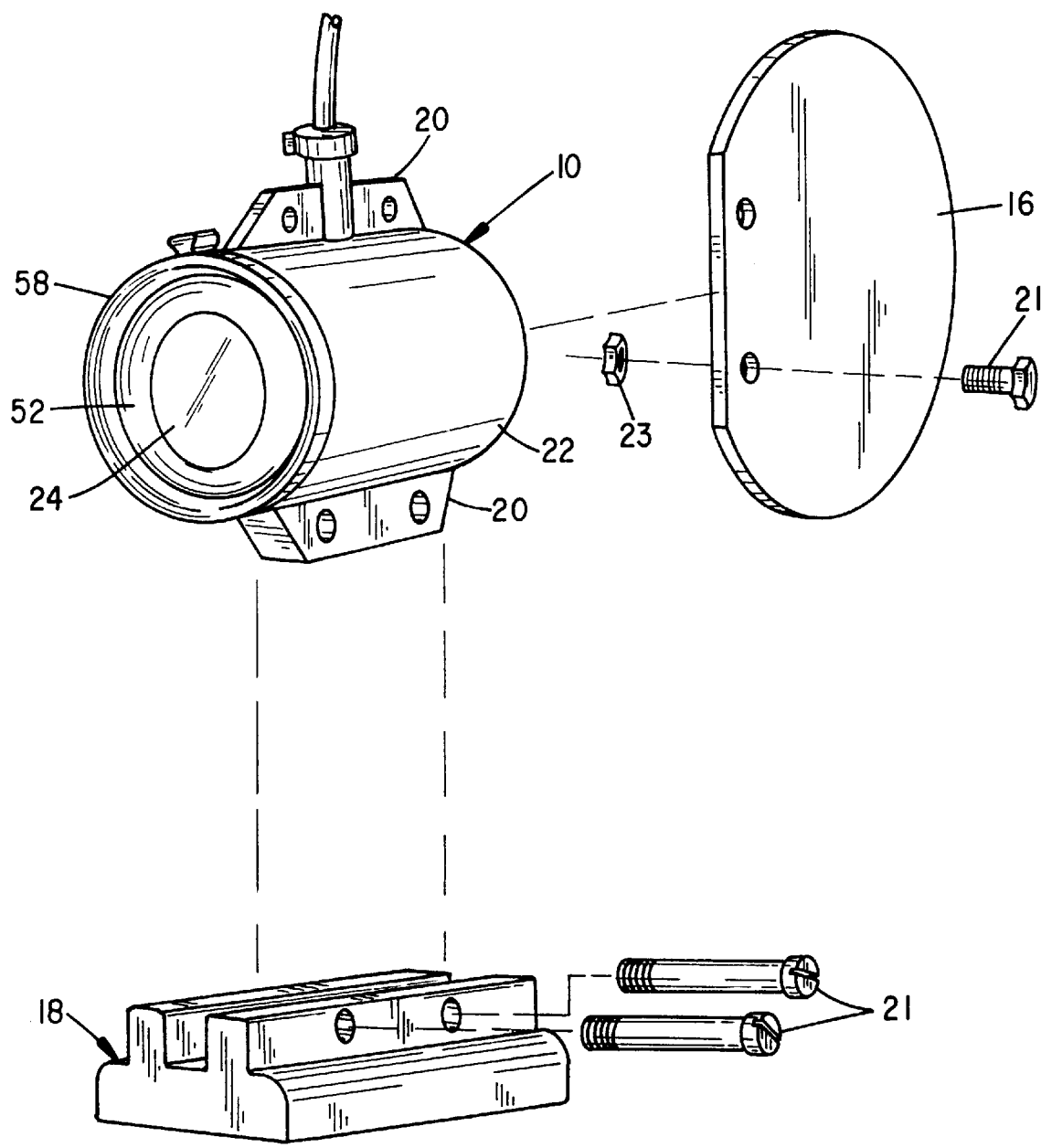
FIG. 3 is an exploded assembly drawing to the camera, ballast and rudder and wherein the camera is shown in partial section.
Figure 4:
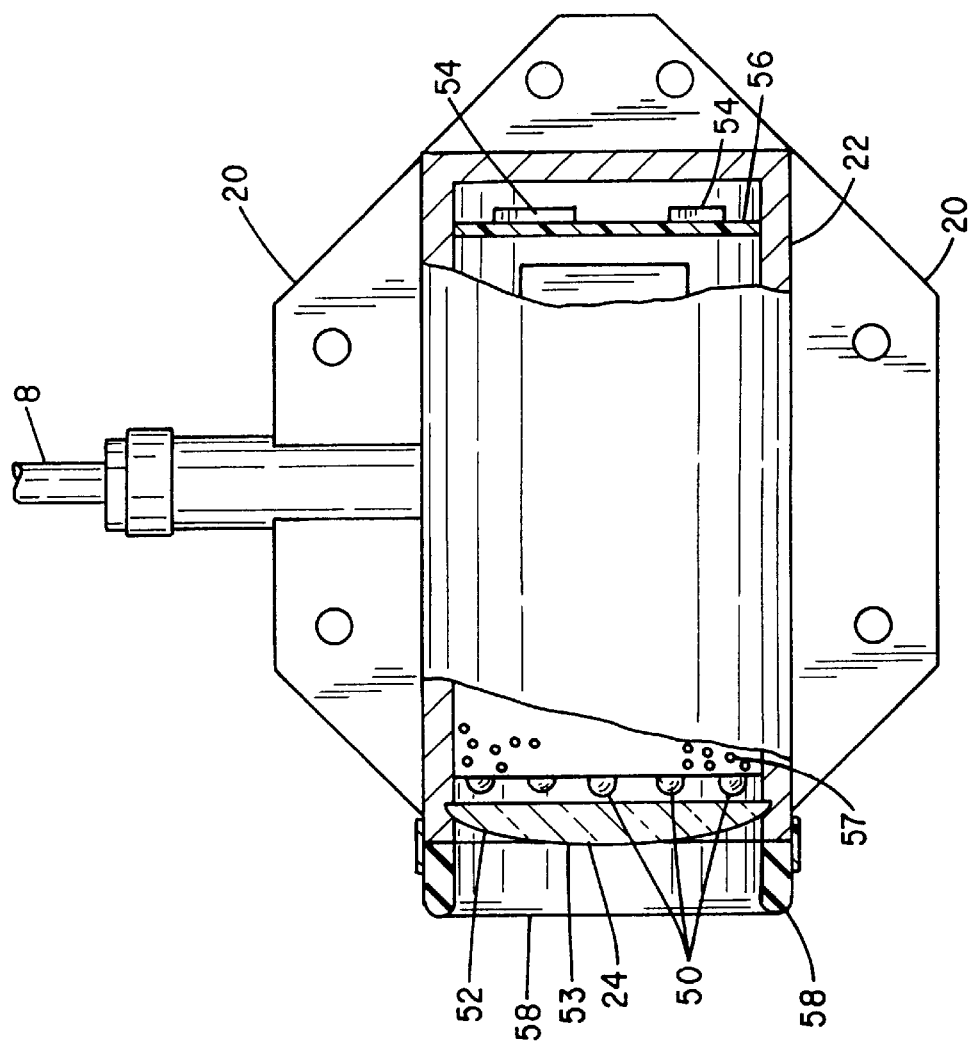
FIG. 4 is a partial cross section drawing through the camera.
Figure 5:
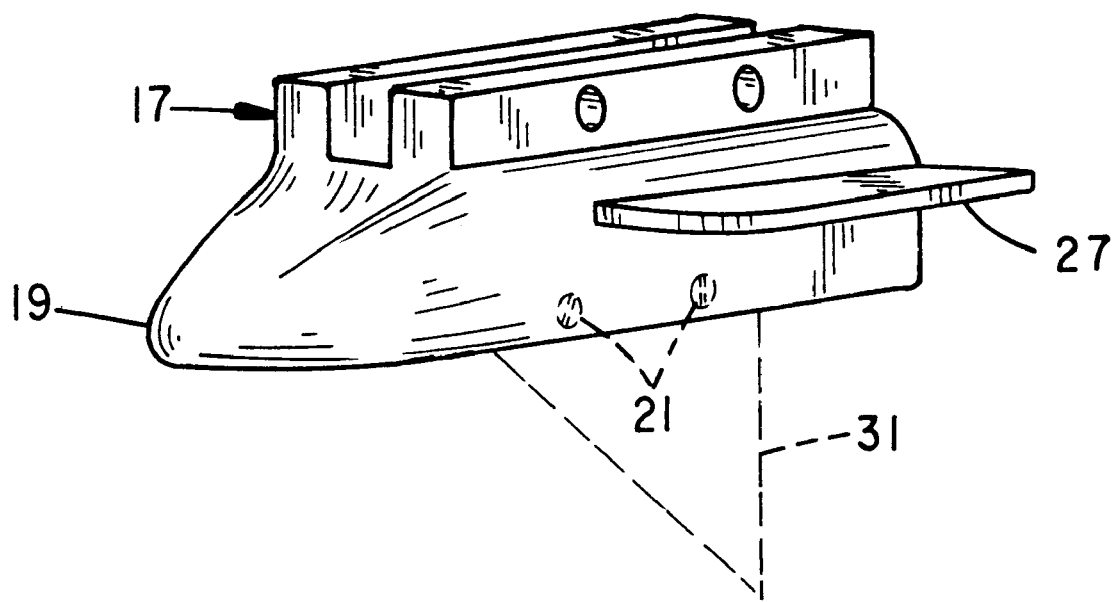
FIG. 5 is a perspective drawing to a hydrodynamic ballast weight.

With additional attention to FIGS. 3, 4 and 5, a relatively constant orientation of the camera 10 is obtained with a rudder 16 and a ballast weight 18. Normally, the camera 10 is towed with a lens 24 facing either forward or backward. The ballast weight 16 is supported to one of a number of flexible webs 20 that radiate from a rubberized housing or cover 22 at the camera 10. Bolt and/or nut fasteners 21 and 23 secure the rudder 16 and ballast weight 18 to the camera 10.

The ballast weight 16 stabilizes the camera 10 and adds weight to minimize the length of cable that must be deployed. A short cable facilitates camera control and the ballast weight 18 provides a generally vertical presentation at slow boat speeds. The amount of ballast weight 18 can be varied to offset the drag of the cable 8 and camera 10. A weight in the range of 1 to 10 pounds is believed sufficient for the present system 2, when used in freshwater.

The rudder 16 is also secured to the aft web 20 of the camera 10 with fasteners 21 and 23. The shape of the rudder 16 can be varied as desired. Presently, the rudder 16 is constructed from a Plexiglas material. The rudder 16 can be constructed to a variety of shapes from a variety of materials. The rudder 16 may include additional sections that are hinged to pivot relative to each other. The rudder 16 stabilizes the camera tracking and minimizes wobble or rotation. The resiliency of the web 20 also facilitates rudder movement and camera tracking by accommodating some side currents. The rudder 16 can also be outfitted with a servo-controller (not shown) to change the rudder angle relative to the vane 16 to steer the camera 10.

FIG. 5 shows a ballast 17 that can be used in lieu of the ballast 18. The ballast 17 has a bulbous nose 19 and right and left side planing wings 27. The nose 19 and wings 27 improve the hydrodynamic tracking properties of the ballast 17 and camera 10. A keel 31 (shown in dashed line) can also be mounted to the ballast 17 with fasteners 21. The keel 31, versus the rudder 16, finds application when a rear-facing camera configuration is assembled (e.g. a single rear pointed camera 10 or separate fore and aft pointed cameras 10).

Strain and stretching of the conductors 12, due to the ballasts 17 or 18 and normal towing, is prevented via the KEVLAR cord or braiding 26 that is contained in the cable 8. Vanes 30 having a variety of hydrodynamic shapes to maintain camera orientation and reduce the drag and cable tension can also be attached to the cable 8 with clips 29. The vanes 30 can also be molded into the cable cover 9. One or more servo-controlled or steerable vanes 30 might also be mounted to the cable 8 to overcome cable twisting and provide steady camera tracking.

Figure 6:
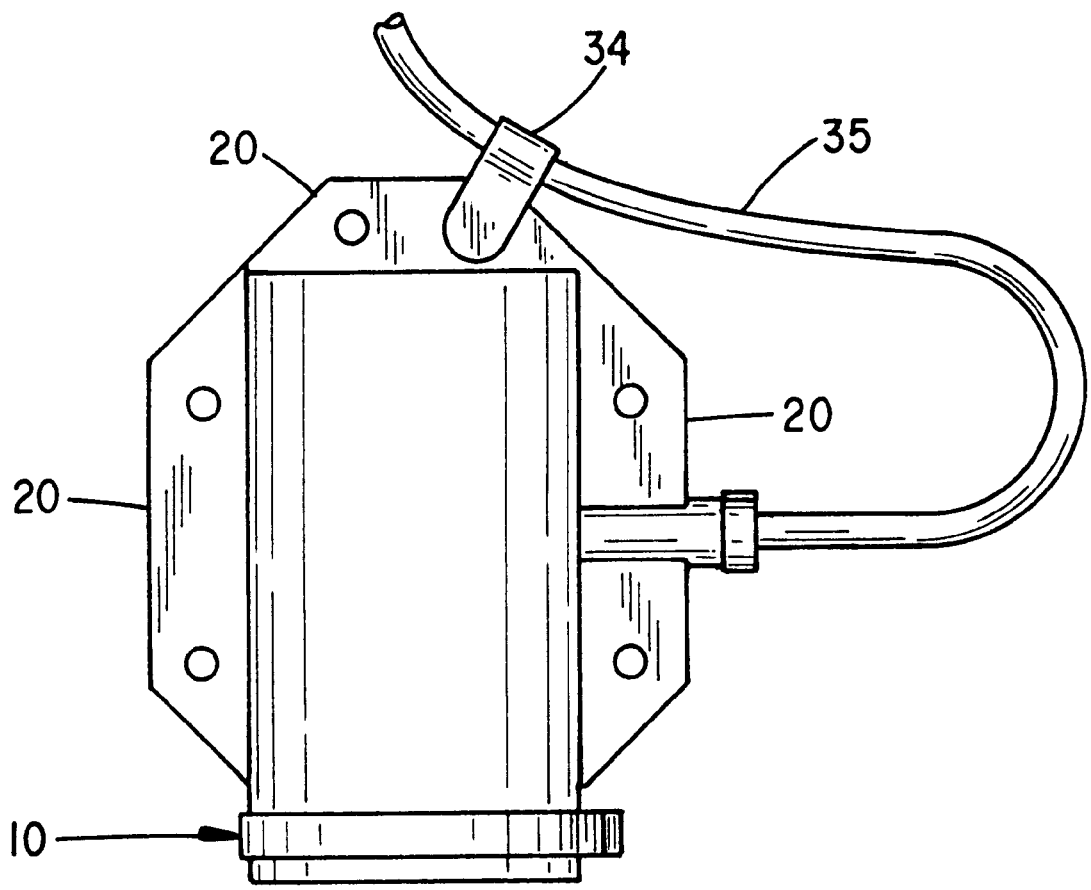
FIG. 6 is a plan view to the camera rigged for vertical viewing.

In addition to being towed by a boat, the viewing system 2 can be used in a variety of other applications. FIGS. 6 through 10 depict alternative mountings of the camera to accommodate some of these applications. FIG. 6 shows the camera 10 suspended in a vertical orientation with the lens 24 pointed down to permit bottom viewing. A clip 34 secures a loop 35 of the cable 8 to the aft web 20. The weight of the camera 10 is thereby distributed to tip the lens 24 to a desired angle.

The clip 34 finds particular application when suspending the camera 10 from a relatively stationary platform, such as an ice fishing house or other stationary structure. Other attachments can be fitted to the cable 8 and/or camera 10 to control the orientation of the camera 10 such as shown at FIGS. 7, 8 and 9.

Figure 7:
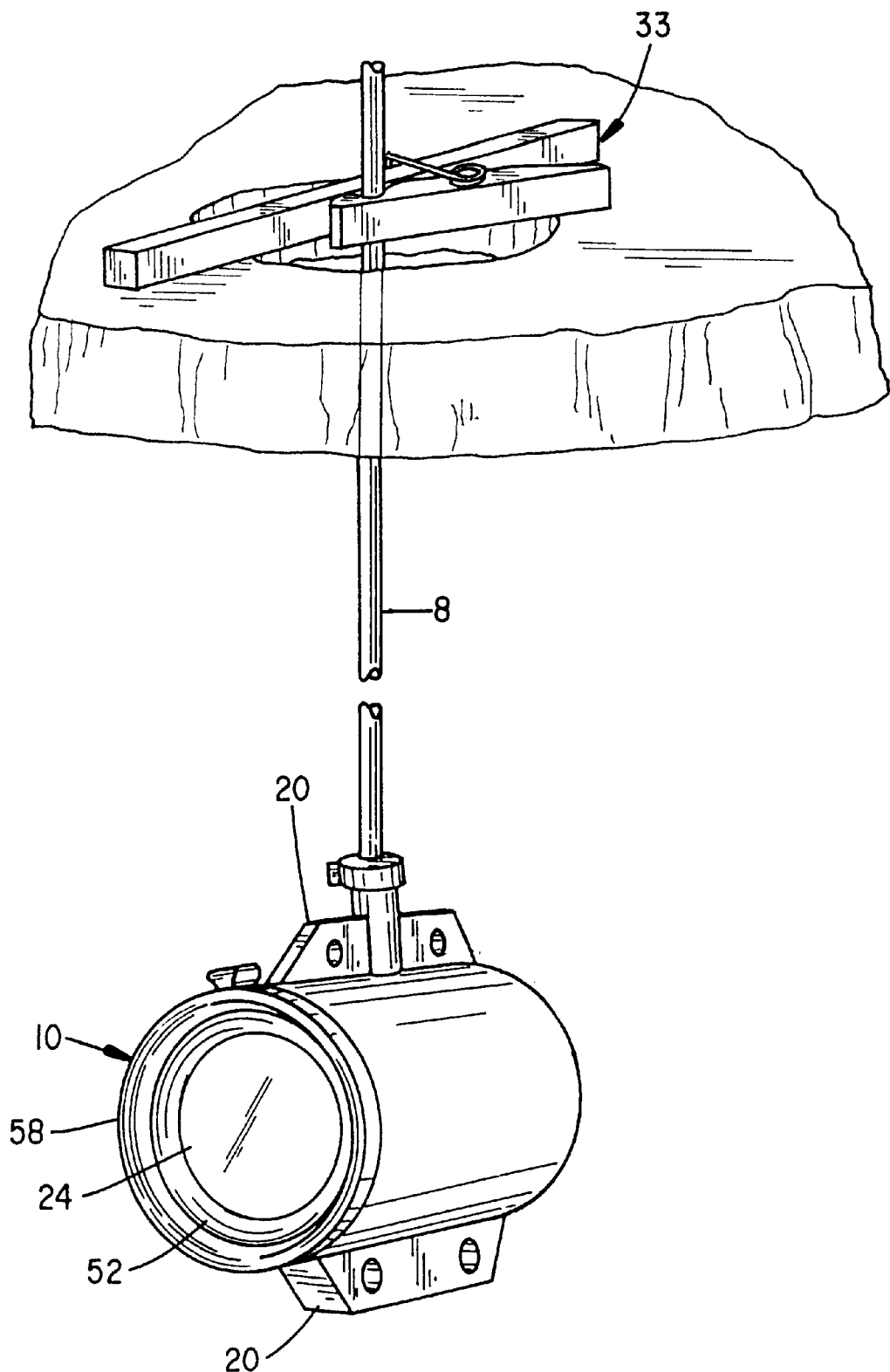
FIG. 7 is a perspective view of a camera suspended from an ice hole.

FIG. 7 shows an arrangement where a support 33 grips the cable 8 and suspends the camera 10 from an ice hole. The support 33 spans the hole and includes an arm 35 that is biased by a spring 37 to grip the cable 8.

Figure 8:
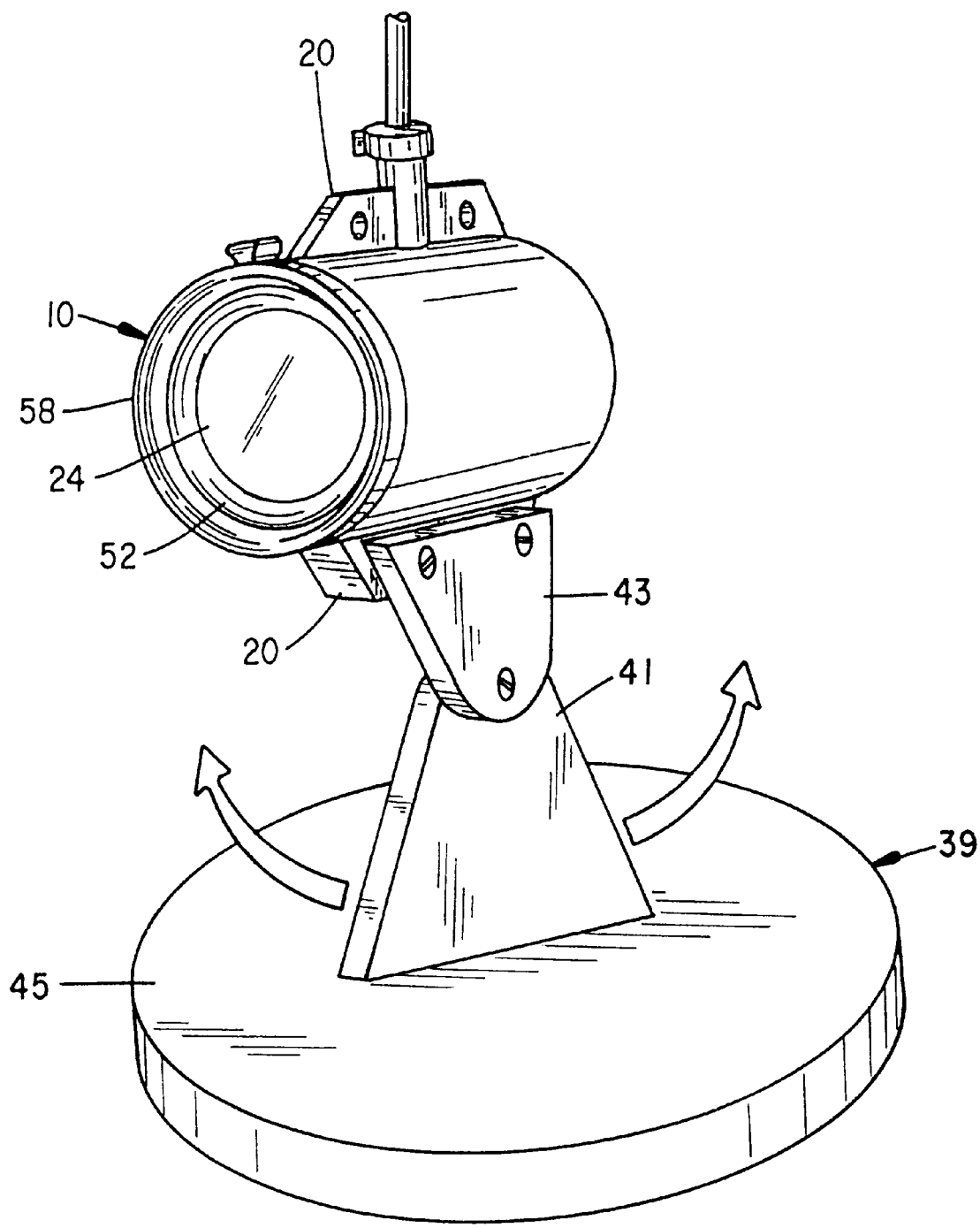
FIG. 8 is a perspective view of a weighted, adjustable stationary support that supports the camera at a selected orientation to a lake bottom.

FIG. 8 shows a support 39 that contains the camera 10 and can rest on the bottom of a lake. The orientation of the camera 10 can be changed by varying the relative angle of pivot arms 41 and 43 and the rotation of a relatively heavy base plate 45.

Figure 9:
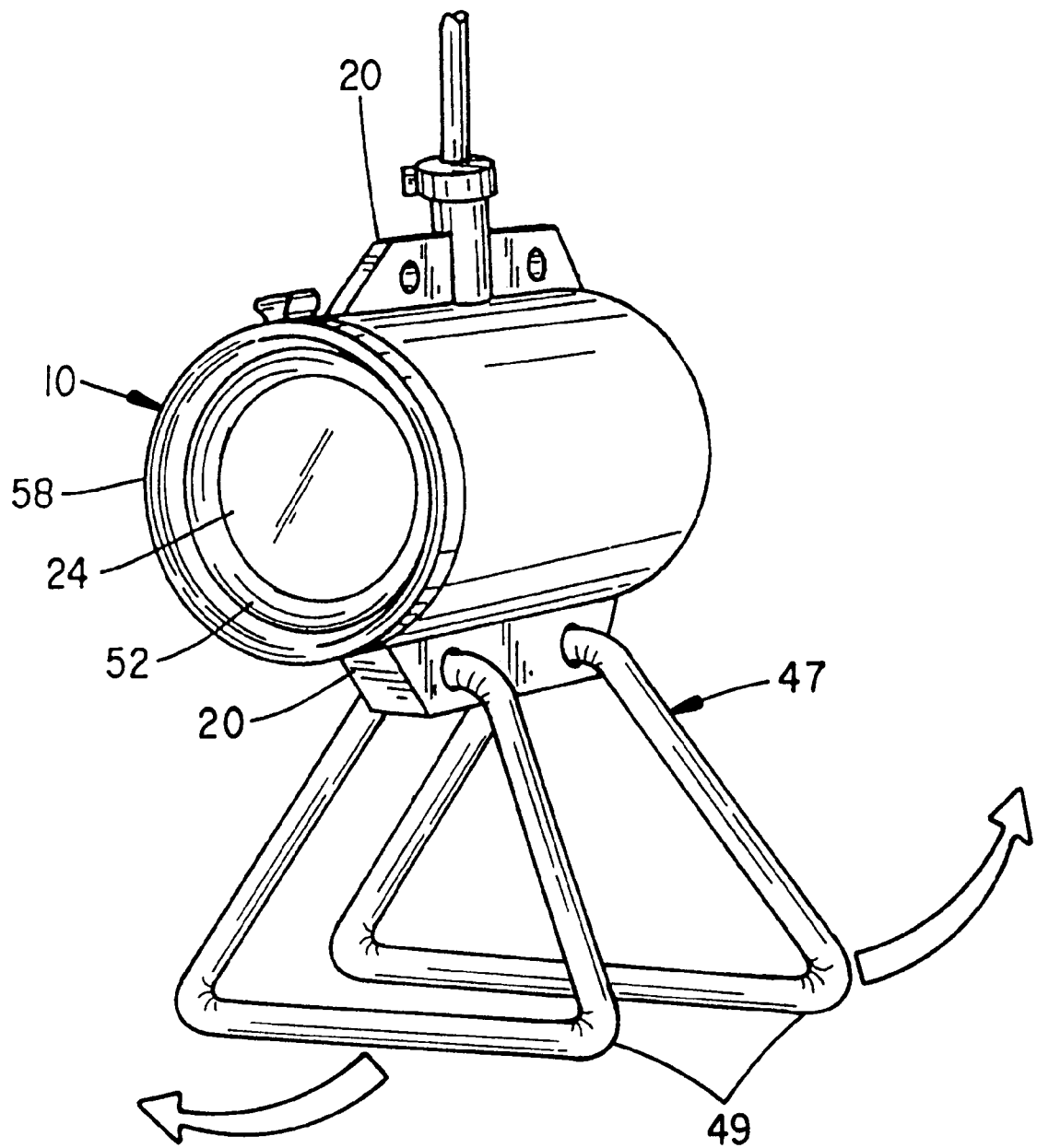
FIG. 9 is a perspective view of a wire formed, adjustable stationary support that supports the camera at a selected orientation to a lake bottom.

FIG. 9 shows another bottom camera support 47. A pair of formed arms 49 are secured to the web 20. The arms 49 can be splayed apart to support the camera 10 at the bottom, such as a mud bottom. The camera 10 can also be tipped or rotated relative to the arms 49 to obtain a preferred viewing orientation. The arms 49 can be weighted or mounted to holes provided at a separate ballast weight.

Figure 10:
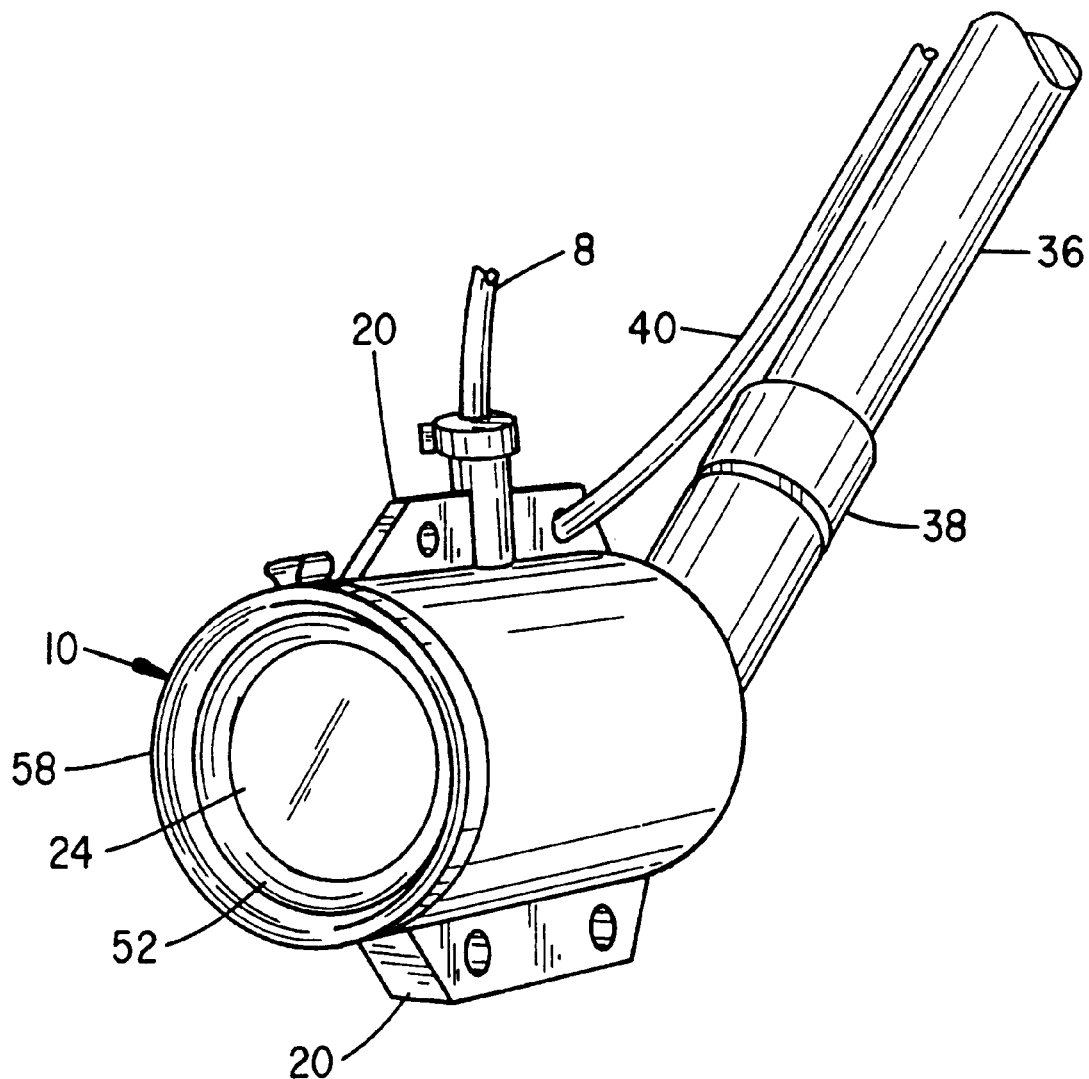
FIG. 10 is a perspective view of the camera rigged to a pole and with a steering cable.

FIG. 10 shows a mounting arrangement of the camera 10 wherein the camera 10 is secured to a pole 36. The pole 36 allows an operator to view under docks, inspect the bottom of a boat, walls of a swimming pool or other submerged structures etc. A swivel coupler 38 is fitted between the pole 36 and camera 10 and a steering wire 40 is secured to the top camera web 20. The coupler 38 houses a joint capable of motion in multiple axes. As the wire 40 is extended, retracted or rotated the camera 10 can be tipped and/or rotated in relation to movement of the pole 36 to optimally position the camera 10 for viewing.

A variety of coupler types 38 that include ball or universal joints to provide a desired freedom of movement can be fitted to the camera 10. The specific mechanical attachment to the camera 10 will depend upon the configuration of the coupler 38. The cable 8 might also be outfitted with a steering wire 40 or servo-control that cooperates with a coupler 38 at the camera 10 to direct camera motion when towed or suspended.

Figure 11:
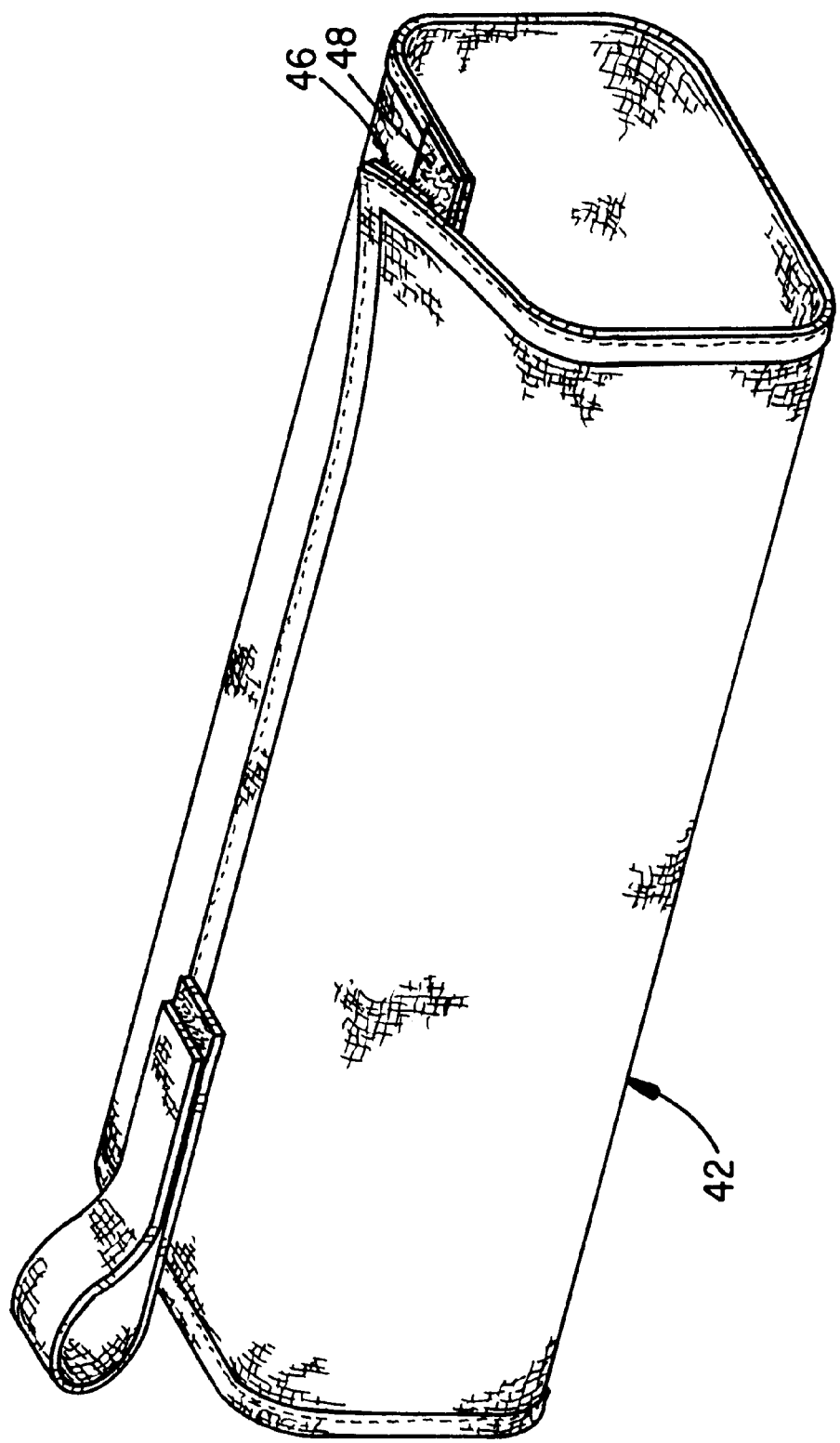
FIG. 11 is a perspective view shown in partial cutaway to the viewing monitor shrouded with a fitted fabric sun shield.

Depending upon ambient lighting conditions at the surface and below the water, the system 2 includes provisions at the monitor 6 and camera 10 to improve viewing. A sunshield 42 is shown at FIG. 11 that can be mounted to the monitor 6 to overcome sunlight and reflections at the screen 44. The shield 42 is made from an opaque fabric material and can be sewn to a shape appropriate to fit the monitor 6. Alternatively, strips of hook and loop fastener material 46 and 48, such as VELCRO, or other mating fasteners can be positioned over the surface of the shield 42 to fit monitors of a variety of shapes. Contrast and gain controls at the monitor 6 can also improve viewing. The sunshield 42 might also be constructed with multiple telescoping sections that mount to each other. The sections of the sunshield 42 can also be constructed of rigid materials, such as various plastics or sheeting materials.

Returning attention to FIG. 4 and mounted inside the camera housing 22 and around the camera lens 24 are a number of infrared (IR) lights 50 that operate in the range of 750 to 900 nanometers. Power to the lights 50 is provided from the boat 4. The lights 50 increase the available ambient light and can improve the viewing distance by several feet. The lights 50 find particular application when attempting viewing in stained waters or at depths of 30 or more feet. Typical viewing distances of 10 to 15 feet are possible with the camera 10. Although IR lights 50 are presently preferred, infra-blue (IB) lights can be used to provide better light penetration with less scattering.

Although improving viewing, reflection of the lights 50 at the inside surface of the lens 24 can raise the operating temperature of the camera 10, which condition is partially offset by the cooling provided by the water. Particulates in the water can also reflect light back into the lens 24. These reflections can be minimized with a bi-focal surface 52 at the lens 24. The surface 52 aligns with the lights 50 and diffuses light away from the center of the lens 24. The surface 52 can be formed into the lens 52 or as a separate lens. An anti-reflective coating 53 to IR light is also applied to the interior of the lens 24 to minimize and/or prevent reflections. An ultraviolet (UV) coating can also be included at the outer surface of the lens 24 to improve image contrast.

Internal operating temperatures of the camera 10 can also be minimized by mounting one or more piezoelectric coolers 54 to the back of a circuit board 56 that controls the camera 10 and other circuitry at the camera 10. The additional cooling from the coolers 54 can reduce the operating temperature to 10 degrees Centigrade versus a normal operating temperature of 30 to 40 degrees Centigrade.

The camera's rubber housing 22 is also constructed to provide an extension ring 58 that projects beyond the lens 24. The ring 58 provides a resilient surface or bumper that protects the lens 24. The lens 24 is thereby less susceptible to abrasion and scratching, for example, if rocks or other hard objects are encountered.

The housing 22 is also filled with a desiccant material 57 (e.g. $SiO_2$) to prevent moisture that might occur with normal expansion and contraction of the housing 22. The interior of the housing 22 can also be charged with an inert gas such as nitrogen or argon to prevent fogging at the lens 24.

Figure 12:
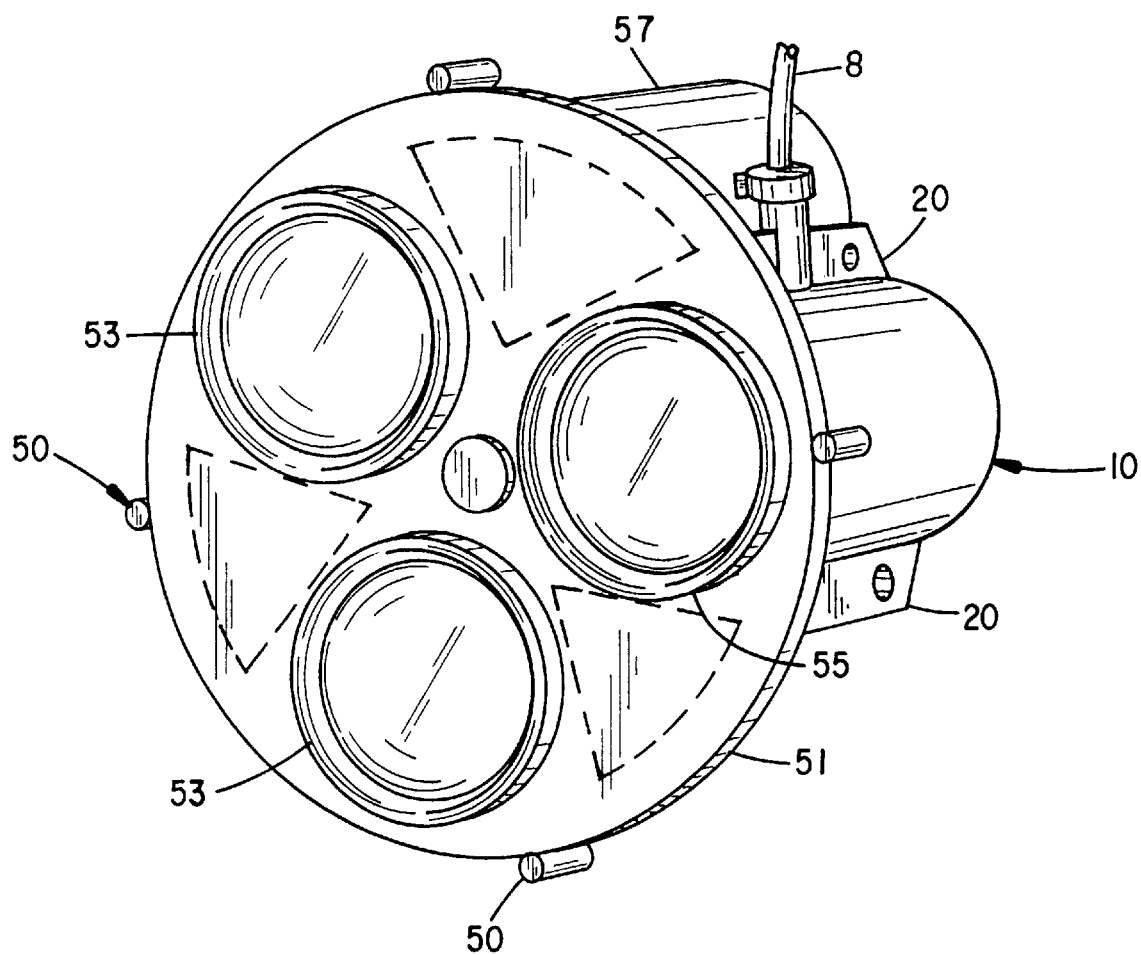
FIG. 12 is a perspective view of a camera fitted with a servo-controlled collar that supports a number of filters and/or lenses that can be rotated into registry with the camera lens.

A filter and/or lens collar 51 that can be mounted, either external, as shown, or internal, to the camera 10 is shown at FIG. 12. The collar 51 facilitates viewing in water of differing clarity and diffused sunlight conditions. The collar 51 supports a number of filters 53. The collar 51 might also support one or more lenses 55 of various magnifications or having other desired optical characteristics. Additional lights 50 can also be secured to the collar 51 to increase illumination in heavily stained waters. A servo drive 57 mounted to the collar 51 selectively rotates a desired filter 53 or lens 55 into alignment with the lens 24. The rotation can be performed either manually or under operator control via one of the conductors 12. Alternatively, a conventional threaded collar 51 can be fitted to the camera 10 to receive a single one of a variety of conventional filters 53 or lenses 55. Typical filters 53 can filter light from any desired portion of the visible spectrum, for example, blue or red light. A filter that polarizes the light can also be attached.

The outer periphery of the collar 51 can also be shaped to shade the lens 24 from ambient light in the water. Another collar might also be added or used alone to provide shade. The collar 53 may also include apertures (shown in dashed line) between the filters 53 and/or lenses 51 to permit water to flow through the collar 53.

Figure 13:
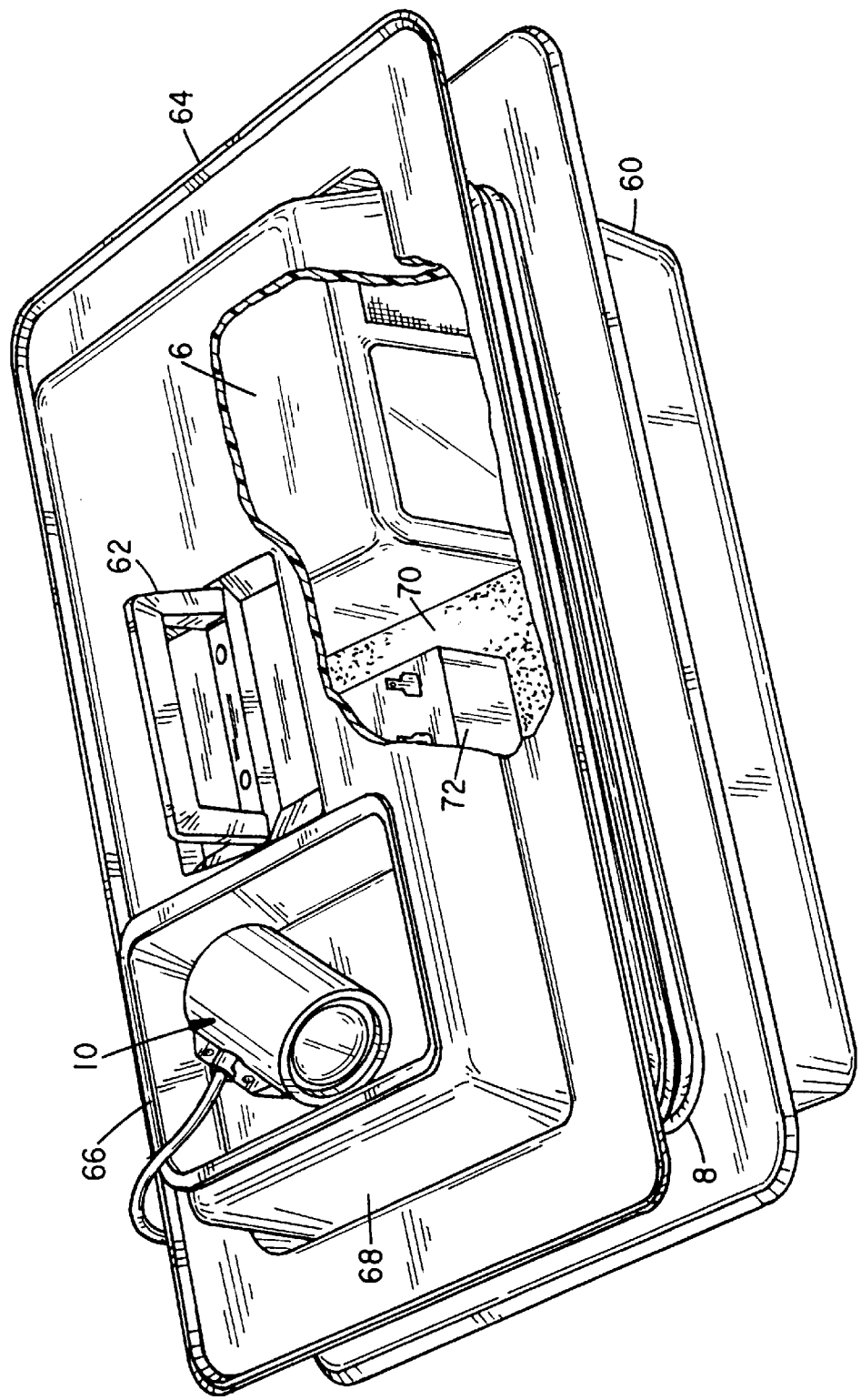
FIG. 13 is a perspective view of a carry case for the system components.

FIG. 13 depicts a portable storage arrangement of the system components. A carry case 60 having a handle 62 is fitted with a spool 64 that contains the cable 8. A bin 66 is recessed into a hinged cover 68 and supports the camera 10. A shaped foam pad 70 inside the case 60 supports the monitor 6, a battery power supply 72 and other system accessories, such as the rudder 16, ballast 18, cable clip 34 and sunshield 42.

Figure 14:
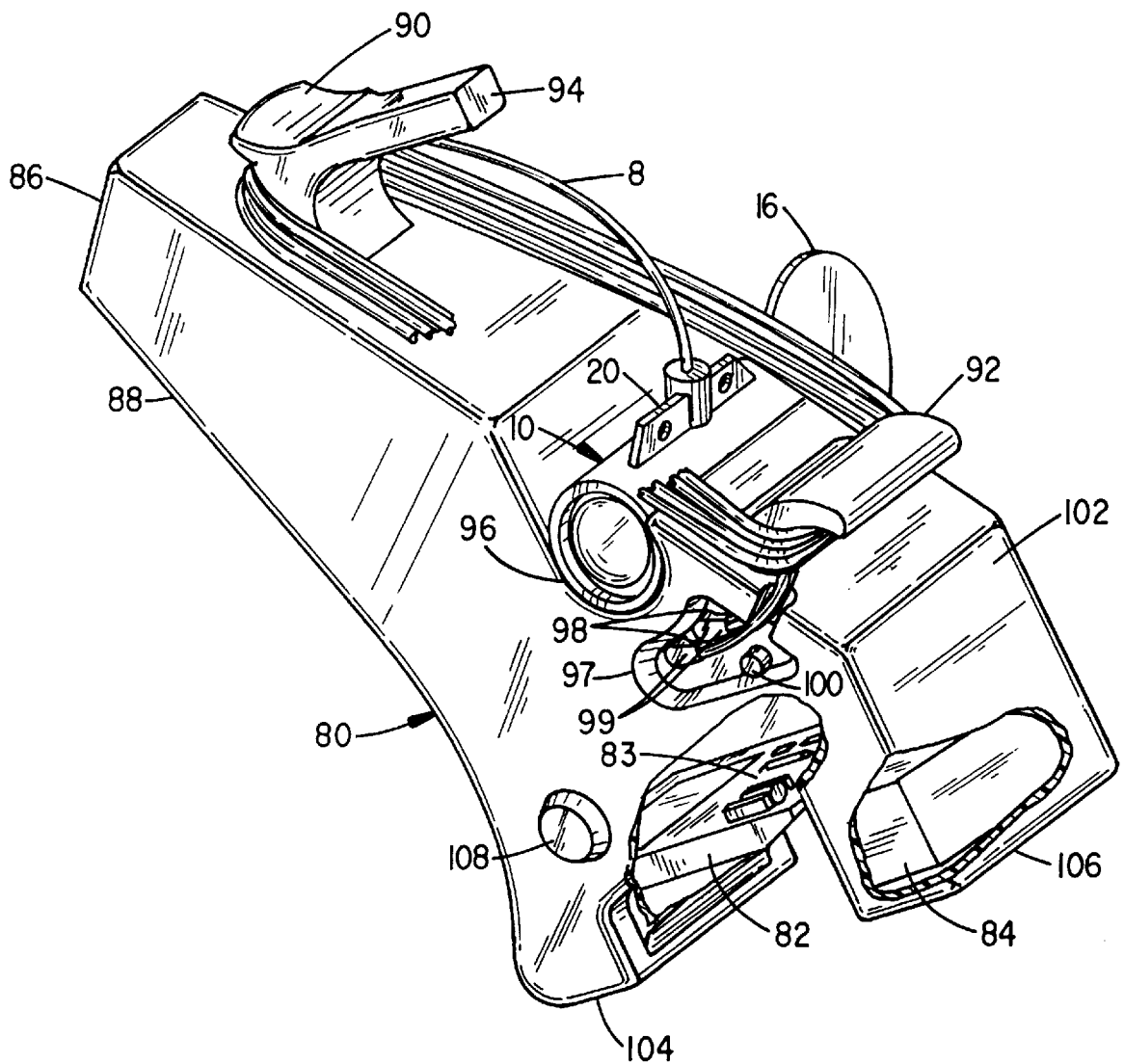
FIG. 14 is a perspective view, shown in partial cutaway, of the system components mounted in a monitor housing that includes an integral sun shield, the camera and cable and sundry accessories.

Although the carry case 60 adequately contains the system 2 and accommodates normal deployment of the monitor 6 and camera 10, it is preferable to integrate many of the components that are accessed by the operator into a self-contained package. FIG. 14 depicts a housing 80 that is constructed to securely contain a monitor 82, battery supply 84 and necessary control circuitry 83 into a single housing 80. The monitor 82 is viewable through a viewing port 86 at an integrated sunshield 88. The sunshield extends a sufficient distance and tapers inward to minimize the effects of ambient lighting in viewing the monitor 82. Although a rigid single section sunshield 88 is shown, the sunshield 88 can be constructed of telescoping sections.

The cable 8 wraps over curved wrap arms 90 and 92. The arm 90 is projects from the sunshield 88. A carry handle 94 extends from the arm 90. A recessed cavity 96 is provided between the arms 90 and 92 to supports the camera 10, attached rudder 16 and/or ballast 18. Other recesses or compartments might be provided in the housing 80 to contain other accessories.

Necessary electrical attachments and controls are provided at a recess 97 in a side wall. Couplers 99 at the ends of the conductors 12 mount to the available fittings 98. A multi-position switch 100 controls power to the camera 10, lights 50 and monitor 6. A removable cover plate 102 provides access to the battery 84, monitor 82 and control circuitry 83. The control circuitry can accommodate all system functions including battery charging, auxiliary power, communications, servo-control, sensor monitoring and display etc.

With the benefit of the housing 80, the system 2 is deployed by merely extracting the camera 10 and releasing the cable 8 until the camera 10 is properly suspended or positioned at the lake bottom. Viewing is readily accommodated through the viewing port 86, while either seated or standing. The viewing port 86 is positioned in a range of 60 to 80 degrees relative to the support surface on which the housing 80 rests.

Although the housing 80 is normally supported from a pair of feet 104 and 106 on a hard surface, pivot arms 108 project from each side of the housing 80. The pivots 108 mount to a bracket 110 that can be mounted to a wall of the boat 4. The housing 80 can be restrained with hand fasteners 111, reference FIG. 15. Gripping pads, magnets, suction cups or other gripping aids may also be supported to the feet 104 and 106 to stabilized the housing during viewing.

Figure 15:
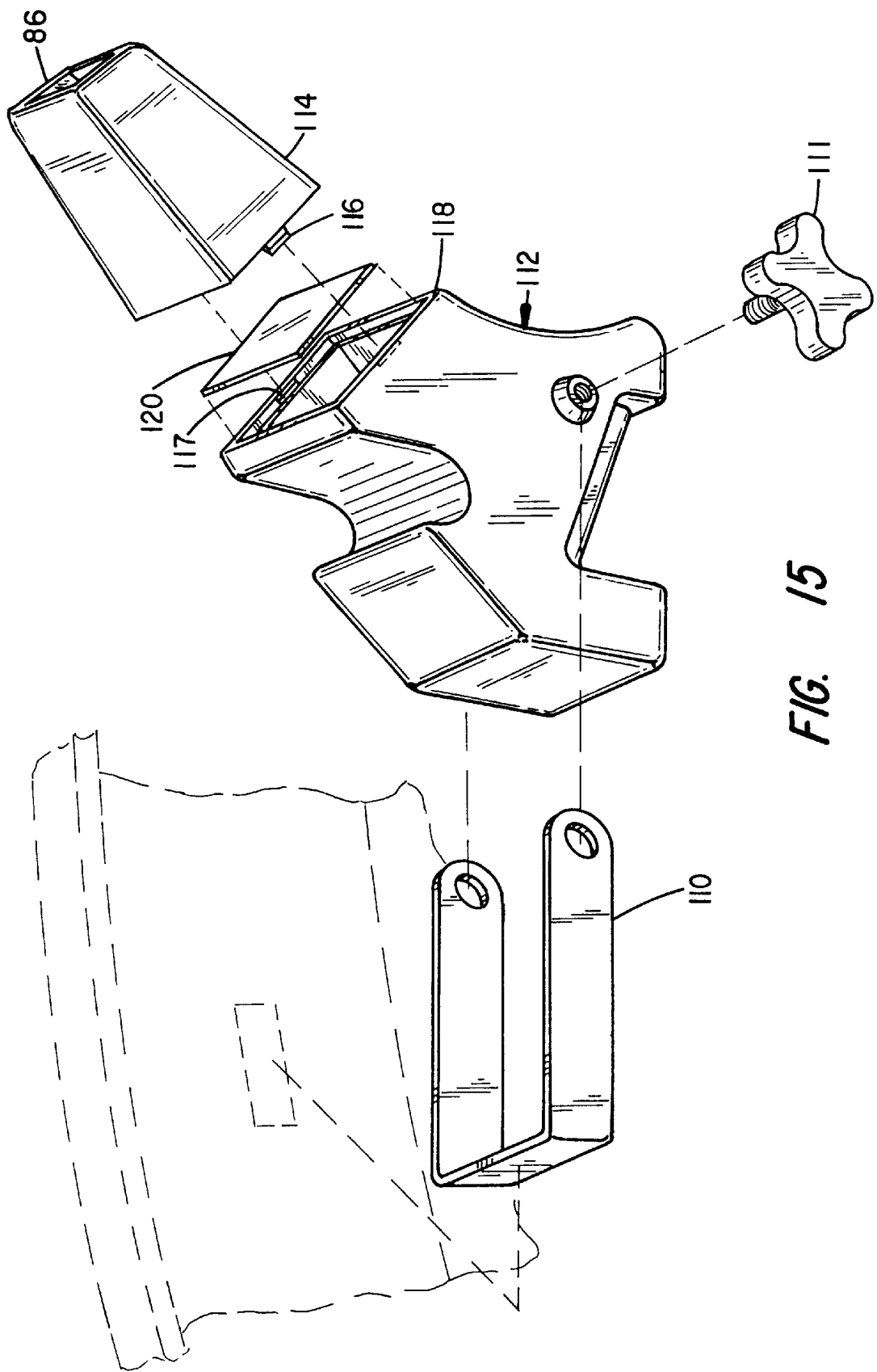
FIG. 15 is a perspective view of a monitor housing wherein the sun shield can be rotated or removed to permit viewing through a filter screen and/or the housing can be mounted to rotate at a support bracket.

With attention to FIG. 15, a housing 112 is shown that is similar to the housing 80. A detachable sunshield 114 attaches to the housing 112 at a number of mating fasteners 116, and 117, such as overlapping flanges of interlocking projections and apertures. The sunshield 114 can also be hinged to the housing 112. The size of the viewing port 118 is provided at the point of attachment of the sunshield 114. The port 86 or 118 can thereby be varied. The port 118 can also be covered with a darkened glass screen or cover 120, when the sunshield is not required.

FIG. 16 shows the housing 80 outfitted with a cable boom arm 15. A motor contained in the housing 80 and operating under the internal controls deploys the cable 8. If used with a boat, the housing 80 would normally be secured to the boat to assure proper control over the cable. Although not shown, cable wrap arms 90 and 92 can be incorporated into the housings 80 and 112 of FIGS. 15 and 16.

While the invention has been described with respect to a preferred construction and considered improvements or alternatives thereto, still other constructions and improvements may be suggested to those skilled in the art. The foregoing description should therefore be construed to include all those embodiments within the spirit and scope of the following claims.

What is claimed is:

1. A submersible video viewing system, comprising:
    a) a camera encased in a waterproof rubber housing, wherein a plurality of infrared lights are mounted in the housing in concentric relation to a camera lens, wherein the lens is coated with an anti-reflective material, wherein the camera housing includes a desiccant, and wherein a plurality of webs project from the camera housing to support accessories selected from a class including ballast weights, rudders, couplers, and camera orientation supports;

b) a cable including a plurality of conductors and a strain relief member coextensive with said conductors and secured to the camera housing, and wherein the conductors and strain relief member are contained in a foam filled core; and c) a power supply and monitor means coupled to said camera by said cable and both mounted in a monitor housing for displaying images captured by said camera at a display screen mounted in the monitor housing and positioned to be visible through a viewing port that opens through an elongated portion of the housing that extends at an angle in the range of 60 to 80 degrees relative to a base of the monitor housing, whereby sun is shielded from the display screen.

2. A viewing system as set forth in claim 1 including selector means for manipulating each of a plurality of view enhancing devices mounted to said housing and selected from a class including filters and lenses into alignment with the camera lens.

3. A viewing system as set forth in claim 1 wherein the housing includes first and second cable wrap projections and wherein the housing includes a recessed cavity set between said first and second cable wraps that supports the camera.

4. A submersible video viewing system, comprising:

a) a video camera encased in a waterproof rubber camera housing, wherein the camera housing includes a desiccant, wherein first and second webs project from the camera housing and wherein a rudder extends from the first web and an aerodynamically shaped ballast weight is supported to the second web;

b) a cable including a plurality of conductors and a strain relief member that extends coextensive with said conductors and is secured to the camera housing, and wherein the conductors and strain relief member are contained in a foam filled core; and c) a power supply and monitor means having a display screen coupled to said camera by said cable and both mounted to a monitor housing for displaying images captured by said camera at said display screen, whereby said camera tracks movement of said cable.

5. A viewing system as set forth in claim 4 wherein the cable includes a hygroscopic material that upon exposure to water self seals abrasions or nicks in the cable, whereby the migration of moisture to the camera is prevented.

6. A viewing system as set forth in claim 4 wherein a display screen of the monitor means is mounted in the housing to be visible through a viewing port of an elongated sunshield that extends from the housing at an angle in the range of 60 to 80 degrees relative to a support surface upon which the monitor housing rests.

7. A viewing system as set forth in claim 4 wherein a rudder projects from said ballast weight.

8. A submersible video viewing system, comprising:

a) a camera encased in a waterproof rubber housing, wherein a plurality of infrared lights are mounted in the housing in concentric relation to a camera lens, wherein the camera housing includes a desiccant, and wherein a plurality of webs project from the camera housing to support accessories selected from a class including ballast weights, rudders, couplers, and camera orientation supports;

b) a cable including a plurality of conductors and a strain relief member coextensive with said conductors and secured to the camera housing; and c) a power supply and monitor means having a display screen coupled to said camera by said cable and both mounted in a monitor housing for displaying images captured by said camera at said display screen and positioned to be visible through a viewing port, whereby sun is shielded from the display screen.

9. A viewing system as set forth in claim 8 wherein a coupler capable of movement in a plurality of axes is mounted to the camera housing and including means for manipulating the coupler to direct the camera.

10. A viewing system as set forth in claim 9 wherein a wire is mounted to the cable and connected to said coupler to direct the position of the camera.

11. A viewing system as set forth in claim 9 including a pole mounted to said coupler.

12. A submersible video viewing system, comprising:

a) a camera encased in a waterproof rubber housing, wherein a plurality of infrared lights are mounted in the housing in concentric relation to a camera lens and wherein a plurality of webs project from the camera housing to support at least an aerodynamic ballast weight and a rudder;

b) a cable including a plurality of conductors and a strain relief member coextensive with said conductors and secured to the camera housing; and c) a power supply and monitor means having a display screen coupled to said camera by said cable and both mounted to a monitor housing for displaying images captured by said camera at said display screen.

13. A viewing system as set forth in claim 12 wherein the cable includes a foam filler and a hygroscopic material that upon exposure to water self seals abrasions or nicks in the cable, whereby the migration of moisture to the camera is prevented.

14. A viewing system as set forth in claim 12 wherein the camera housing includes a $SiO_2$ desiccant.

15. A viewing system as set forth in claim 12 wherein the camera lens includes first and second focal regions and wherein one of the focal regions is aligned to the lights to refract the light away from the first focal region.

16. A viewing system as set forth in claim 12 wherein the camera lens is coated with a material that prevents the reflection of light into the camera housing.

17. A viewing system as set forth in claim 12 including a collar mounted to said camera housing and selector means for manipulating each of a plurality of view enhancing devices mounted to said collar and selected from a class including filters and lenses into alignment with the camera lens.

18. A viewing system as set forth in claim 12 wherein a collar is secured to said camera and an external light is attached to the collar.

19. A viewing system as set forth in claim 12 wherein said display screen is mounted to be visible through a viewing port of a sunshield at said monitor housing.

20. A viewing system as set forth in claim 19 wherein the housing includes first and second cable wrap projections and wherein the housing includes a recessed cavity set between said first and second cable wraps that supports the camera.

21. A viewing system as set forth in claim 20 wherein one of the first and second cable wrap projections includes a handle.

22. A viewing system as set forth in claim 19 wherein the sunshield is removable from the housing and wherein the housing includes pivot means for mounting the housing to pivot at a bracket.

23. A viewing system as set forth in claim 19 wherein a boom means extends from the housing for deploying the cable.

* * * * *